US011106219B2

(12) United States Patent
Toda et al.

(10) Patent No.: US 11,106,219 B2
(45) Date of Patent: Aug. 31, 2021

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Akihiro Toda, Wako (JP); Dan Umeda, Wako (JP)

(73) Assignee: HONDA MOTOR CO., LTD, Tokyo (JP)

(*) Notice: Subject to any disclaimer, the term of this patent is extended or adjusted under 35 U.S.C. 154(b) by 256 days.

(21) Appl. No.: 16/297,796

(22) Filed: Mar. 11, 2019

(65) Prior Publication Data
US 2019/0286160 A1 Sep. 19, 2019

(30) Foreign Application Priority Data
Mar. 15, 2018 (JP) .............................. JP2018-047994

(51) Int. Cl.
*G05D 1/02* (2020.01)
*G06K 9/00* (2006.01)

(52) U.S. Cl.
CPC ......... *G05D 1/0289* (2013.01); *G05D 1/0214* (2013.01); *G05D 1/0223* (2013.01); *G06K 9/00798* (2013.01); *G06K 9/00805* (2013.01)

(58) Field of Classification Search
CPC .. G05D 1/0289; G05D 1/0214; G05D 1/0223; G06K 9/00798; G06K 9/00805; B60W 30/09; B60W 40/02
See application file for complete search history.

(56) References Cited

U.S. PATENT DOCUMENTS

2008/0015772 A1* 1/2008 Sanma ..................... G08G 1/04
701/408

FOREIGN PATENT DOCUMENTS

JP 11-288498 10/1999

* cited by examiner

*Primary Examiner* — Michael V Kerrigan
(74) *Attorney, Agent, or Firm* — Amin, Turocy & Watson, LLP

(57) ABSTRACT

A vehicle control device includes a recognizer configured to recognize a physical object in the vicinity of a host vehicle, a predictor configured to predict that a crossing vehicle will have a prescribed speed or less in a host vehicle lane in which the host vehicle is present on the basis of a state of an oncoming vehicle when the crossing vehicle whose traveling direction is a direction crossing a traveling direction of the host vehicle and the oncoming vehicle with respect to the host vehicle approach a future arrival point of the host vehicle, and a driving controller configured to perform avoidance control for causing the host vehicle to avoid approaching the crossing vehicle by controlling at least one of speed and steering of the host vehicle when the crossing vehicle will have the prescribed speed or less in the host vehicle lane.

7 Claims, 9 Drawing Sheets

VEHICLE CONTROL DEVICE, VEHICLE CONTROL METHOD, AND STORAGE MEDIUM

CROSS-REFERENCE TO RELATED APPLICATION

This application is based upon and claims the benefit of priority from Japanese Patent Application No. 2018-047994, filed Mar. 15, 2018, the entire content of which is incorporated herein by reference.

BACKGROUND

Field of the Invention

The present invention relates to a vehicle control device, a vehicle control method, and a storage medium.

Description of Related Art

In recent years, research on automatically controlling driving of a vehicle (hereinafter referred to as automated driving) has been conducted. On the other hand, technology for transmitting prescribed road information from a device to another vehicle when the device installed in a protective block or a protective membrane installed on a road detects a vehicle is known (see, for example, Japanese Unexamined Patent Application, First Publication No. H11-288498).

SUMMARY

However, when there is another vehicle that is likely to enter a host vehicle lane in which a host vehicle is traveling in conventional technology, a process of causing the host vehicle to travel in consideration of another vehicle's entry into the host vehicle lane has not been sufficiently studied. As a result, in some cases, it may not possible to sufficiently cope with a change in a situation in the vicinity of a host vehicle.

An aspect of the present invention have been made in view of such circumstances and an objective of the aspect of the present invention is to provide a vehicle control device, a vehicle control method, and a storage medium capable of coping with a change in a situation in the vicinity of a host vehicle by performing vehicle control in consideration of another vehicle's entry into a host vehicle lane.

A vehicle control device, a vehicle control method, and a storage medium according to the present invention adopt the following configurations.

(1) According to an aspect of the present invention, there is a provided a vehicle control device including: a recognizer configured to recognize a physical object in the vicinity of a host vehicle; a predictor configured to predict that a crossing vehicle will have a prescribed speed or less in a host vehicle lane in which the host vehicle is present on the basis of a state of an oncoming vehicle when the recognizer recognizes that the crossing vehicle whose traveling direction is a direction crossing a traveling direction of the host vehicle and the oncoming vehicle with respect to the host vehicle approach a future arrival point of the host vehicle; and a driving controller configured to perform avoidance control for causing the host vehicle to avoid approaching the crossing vehicle by controlling at least one of speed and steering of the host vehicle when the predictor predicts that the crossing vehicle will have the prescribed speed or less in the host vehicle lane.

(2) According to an aspect, in the vehicle control device according to the aspect (1), the predictor is configured to predict that the crossing vehicle will have the prescribed speed or less in the host vehicle lane when the recognizer recognizes that the host vehicle lane is an overtaking lane and a preceding vehicle present in front of the host vehicle moves from the host vehicle lane to an adjacent lane adjacent to the host vehicle lane.

(3) According to an aspect, in the vehicle control device according to the aspect (1) or (2), the predictor is configured to predict that the crossing vehicle will have the prescribed speed or less in the host vehicle lane on the basis of a state of the oncoming vehicle when the recognizer recognizes that the crossing vehicle has entered the host vehicle lane by a prescribed distance or more.

(4) According to an aspect, in the vehicle control device according to any one of the aspects (1) to (3), the driving controller changes a degree of avoidance of the avoidance control in accordance with the size of the total length of the crossing vehicle when the predictor predicts that the crossing vehicle will have the prescribed speed or less in the host vehicle lane.

(5) According to an aspect, in the vehicle control device according to the aspect (4), the driving controller increases the degree of avoidance of the avoidance control as the total length of the crossing vehicle increases and decreases the degree of avoidance of the avoidance control as the total length of the crossing vehicle decreases.

(6) According to another aspect of the present invention, there is provided a vehicle control method including: recognizing, by an in-vehicle computer, a physical object in the vicinity of a host vehicle; predicting, by the in-vehicle computer, that a crossing vehicle has prescribed speed or less in a host vehicle lane in which the host vehicle is present on the basis of a state of an oncoming vehicle when it is recognized that the crossing vehicle whose traveling direction is a direction crossing a traveling direction of the host vehicle and the oncoming vehicle with respect to the host vehicle approach a future arrival point of the host vehicle; and performing, by the in-vehicle computer, avoidance control for causing the host vehicle to avoid approaching the crossing vehicle by controlling at least one of speed and steering of the host vehicle when it is predicted that the crossing vehicle will have the prescribed speed or less in the host vehicle lane.

(7) According to another aspect of the present invention, there is provided a computer-readable non-transitory storage medium storing a program for causing an in-vehicle computer to execute: a process of recognizing a physical object in the vicinity of a host vehicle; a process of predicting that a crossing vehicle will have a prescribed speed or less in a host vehicle lane in which the host vehicle is present on the basis of a state of an oncoming vehicle when it is recognized that the crossing vehicle whose traveling direction is a direction crossing a traveling direction of the host vehicle and the oncoming vehicle with respect to the host vehicle approach a future arrival point of the host vehicle; and a process of performing avoidance control for causing the host vehicle to avoid approaching the crossing vehicle by controlling at least one of speed and steering of the host vehicle when it is predicted that the crossing vehicle will have the prescribed speed or less in the host vehicle lane.

According to any one of the aspects (1) to (7), it is possible to cope with a change in a situation in the vicinity of the host vehicle by performing vehicle control in consideration of another vehicle's entry into a host vehicle lane.

DESCRIPTION OF EMBODIMENTS

Embodiments of a vehicle control device, a vehicle control method, and a storage medium of the present invention will be described below with reference to the drawings. Although a case in which left-hand traffic regulations are applied will be described, it is only necessary to reverse the left and right when right-hand traffic regulations are applied.

First Embodiment

[Overall Configuration]

Figure 1:
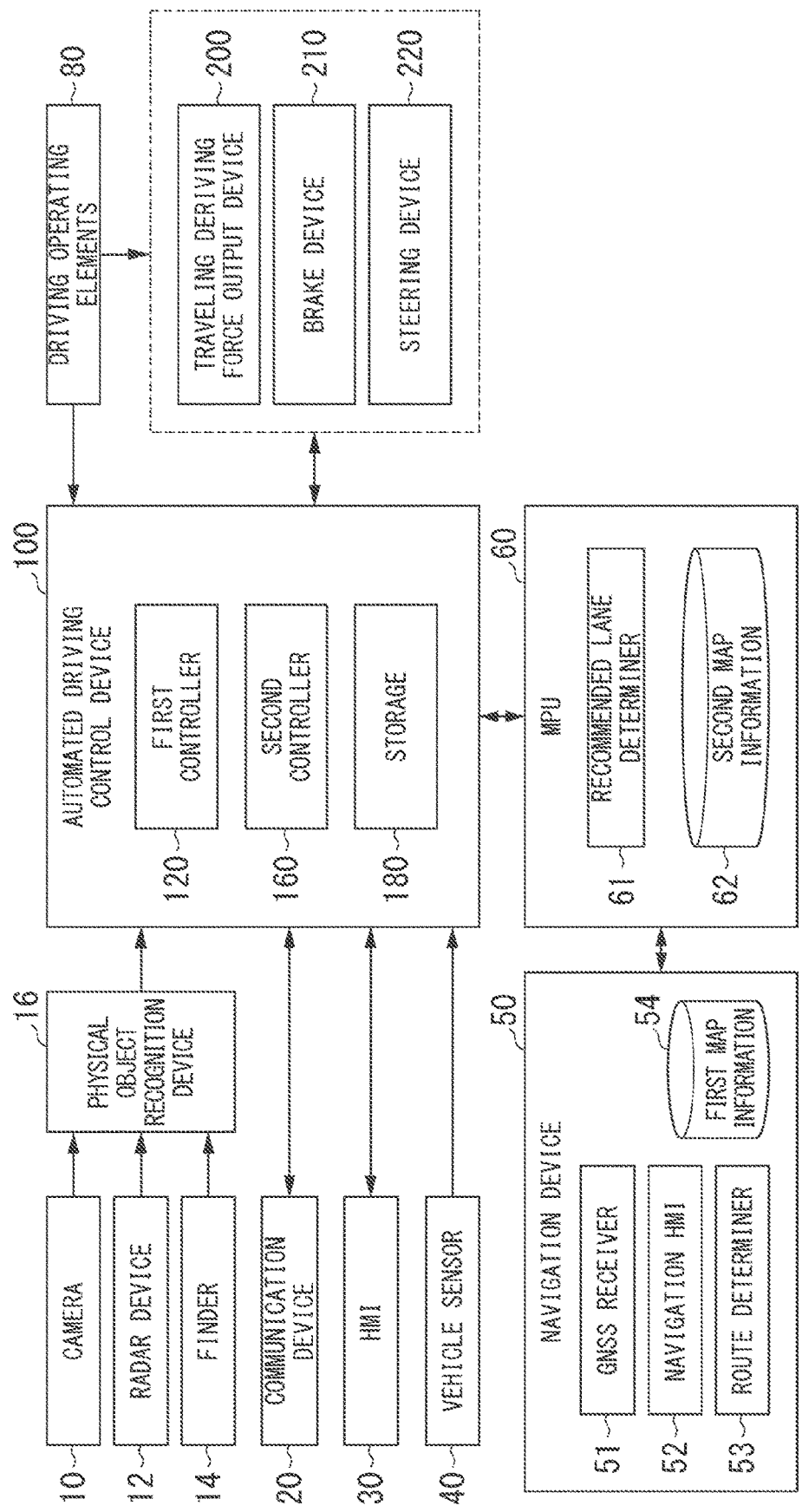
FIG. 1 is a configuration diagram of a vehicle system using a vehicle control device according to a first embodiment.

FIG. 1 is a configuration diagram of a vehicle system 1 using a vehicle control device according to a first embodiment. A vehicle equipped with the vehicle system 1 (hereinafter referred to as a "host vehicle (subject vehicle) M") is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a power generator connected to the internal combustion engine, or discharge power of a secondary battery or a fuel cell.

The vehicle system 1 includes, for example, a camera 10, a radar device 12, a finder 14, a physical object recognition device 16, a communication device 20, a human machine interface (HMI) 30, a vehicle sensor 40, a navigation device 50, a map positioning unit (MPU) 60, driving operating elements 80, an automated driving control device 100, a traveling driving force output device 200, a brake device 210, and a steering device 220. These devices and apparatuses are connected to each other by a multiplex communication line such as a controller area network (CAN) communication line, a serial communication line, a wireless communication network, or the like. Also, the configuration shown in FIG. 1 is merely an example, and a part of the configuration may be omitted or another configuration may be further added.

For example, the camera 10 is a digital camera using a solid-state imaging device such as a charge coupled device (CCD) or a complementary metal oxide semiconductor (CMOS). The camera 10 is attached to any position on the host vehicle M. When a view in front is imaged, the camera 10 is attached to an upper portion of a front windshield, a rear surface of a rearview mirror, or the like. For example, the camera 10 periodically and iteratively images the vicinity of the host vehicle M. The camera 10 may be a stereo camera.

The radar device 12 radiates radio waves such as millimeter waves around the host vehicle M and determines at least a position (a distance to and a direction) of a physical object by detecting radio waves (reflected waves) reflected by the physical object. The radar device 12 is attached to any position on the host vehicle M. The radar device 12 may determine a position and speed of the physical object in a frequency modulated continuous wave (FM-CW) scheme.

The finder 14 is a light detection and ranging or laser imaging detection and ranging (LIDAR) finder. The finder 14 radiates light to the vicinity of the host vehicle M and measures scattered light. The finder 14 determines a distance to an object on the basis of a time from light emission to light reception. The radiated light is, for example, pulsed laser light. The finder 14 is attached to any position of the host vehicle M.

The physical object recognition device 16 performs a sensor fusion process on determination results from some or all of the camera 10, the radar device 12, and the finder 14 to recognize a position, a type, speed, and the like of a physical object. The physical object recognition device 16 outputs recognition results to the automated driving control device 100. The physical object recognition device 16 may output determination results from some or all of the camera 10, the radar device 12, and the finder 14 to the automated driving control device 100 as they are. The physical object recognition device 16 may be omitted from the vehicle system 1.

The communication device 20 communicates with other vehicles present in the vicinity of the host vehicle M using, for example, a cellular network, a Wi-Fi network, Bluetooth (registered trademark), dedicated short range communication (DSRC), or the like or communicates with various types of server devices via a wireless base station.

The HMI 30 presents various types of information to an occupant of the host vehicle M and receives an input operation of the occupant. The HMI 30 includes various types of display devices, a speaker, a buzzer, a touch panel, keys, and the like.

The vehicle sensor 40 includes a vehicle speed sensor configured to determine the speed of the host vehicle M, an acceleration sensor configured to determine acceleration, a yaw rate sensor configured to determine angular speed around a vertical axis, a direction sensor configured to determine a direction of the host vehicle M, and the like.

For example, the navigation device 50 includes a global navigation satellite system (GNSS) receiver 51, a navigation HMI 52, and a route determiner 53. The navigation device 50 stores first map information 54 in a storage device such as a hard disk drive (HDD) or a flash memory.

The GNSS receiver 51 identifies a position of the host vehicle M on the basis of a signal received from a GNSS satellite. The position of the host vehicle M may be identified or corrected by an inertial navigation system (INS) using an output of the vehicle sensor 40.

The navigation HMI 52 includes a display device, a speaker, a touch panel, keys, and the like. The navigation HMI 52 may be partly or wholly shared with the above-described HMI 30.

For example, the route determiner 53 determines a route (hereinafter referred to as a route on a map) from the position of the host vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by a link. The first map information 54 may include a curvature of a road, point of interest (POI) information, and the like. The route on the map is output to the MPU 60.

The navigation device 50 may perform route guidance using the navigation HMI 52 on the basis of the route on the map. The navigation device 50 may be implemented, for example, according to a function of a terminal device such as a smartphone or a tablet terminal possessed by an occupant. The navigation device 50 may transmit a current position and a destination to a navigation server via the communication device 20 and acquire a route equivalent to the route on the map from the navigation server.

For example, the MPU 60 includes a recommended lane determiner 61, and stores second map information 62 in a storage device such as an HDD or a flash memory. The recommended lane determiner 61 divides the route on the map provided from the navigation device 50 into a plurality of blocks (for example, divides the route every 100 [m] with respect to a traveling direction of the vehicle), and determines a recommended lane for each block with reference to the second map information 62. The recommended lane determiner 61 determines what number lane the vehicle travels on from the left. The recommended lane determiner 61 determines the recommended lane so that the host vehicle M will be able to travel along a reasonable traveling route for traveling to an interchange destination when there is an interchange in the route on the map.

The second map information 62 is map information which has higher accuracy than the first map information 54. For example, the second map information 62 includes information about a center of a lane, information about a boundary of a lane, information about a type of lane, or the like. The second map information 62 may include road information, traffic regulations information, address information (an address/zip code), facility information, telephone number information, and the like. The second map information 62 may be updated at any time when the communication device 20 communicates with another device.

For example, the driving operating element 80 includes an accelerator pedal, a brake pedal, a shift lever, a steering wheel, a steering wheel variant, a joystick, and other operating elements. A sensor configured to determine an amount of operation or the presence or absence of an operation is attached to the driving operating element 80, and a determination result thereof is output to the automated driving control device 100 or some or all of the traveling driving force output device 200, the brake device 210, and the steering device 220.

For example, the automated driving control device 100 includes a first controller 120, a second controller 160, and a storage 180. For example, the first controller 120 and the second controller 160 are implemented by a processor such as a central processing unit (CPU) or a graphics processing unit (GPU) executing a program (software). Some or all of these components are implemented, for example, by hardware (a circuit unit including circuitry) such as large scale integration (LSI), an application specific integrated circuit (ASIC), or a field-programmable gate array (FPGA) or may be implemented by cooperation between software and hardware. The program may be pre-stored in the storage 180 of the automated driving control device 100 or stored in a removable storage medium such as a DVD or a CD-ROM, and installed in the storage 180 when the storage medium is mounted in a drive device.

The storage 180 is implemented by, for example, an HDD, a flash memory, an electrically erasable programmable read only memory (EEPROM), a read only memory (ROM), a random access memory (RAM), or the like. The storage 180 stores, for example, a program that is read and executed by the processor.

Figure 2:
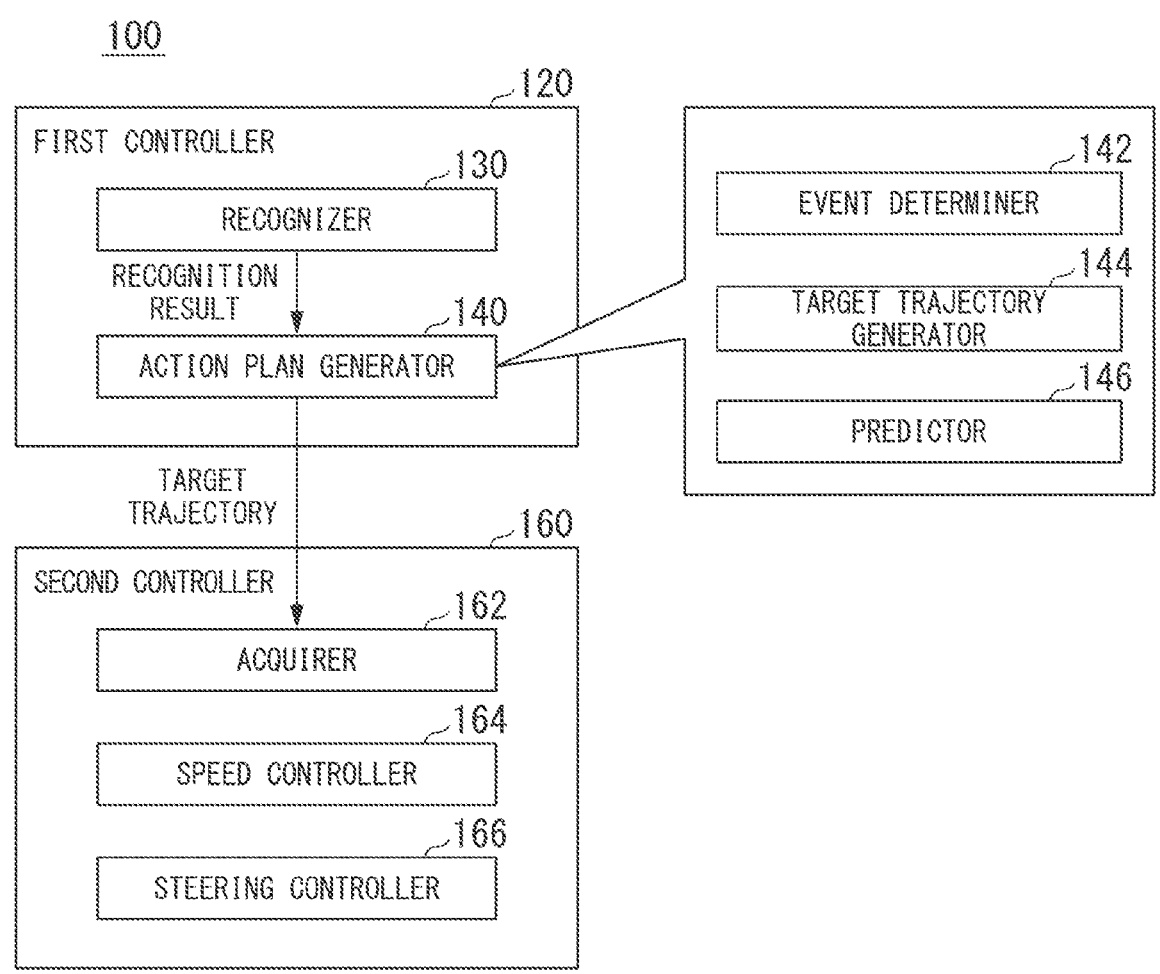
FIG. 2 is a functional configuration diagram of a first controller and a second controller.

FIG. 2 is a functional configuration diagram of the first controller 120 and the second controller 160. The first controller 120 includes, for example, a recognizer 130 and an action plan generator 140. For example, the first controller 120 implements a function based on artificial intelligence (AI) and a function based on a previously given model in parallel. For example, an "intersection recognition" function may be implemented by executing intersection recognition based on deep learning or the like and recognition based on previously given conditions (traffic signals, road markings, or the like, with which pattern matching is possible) in parallel and performing comprehensive evaluation by assigning scores to both the recognitions. Thereby, the reliability of automated driving is secured.

The recognizer 130 recognizes a physical object present in the vicinity of the host vehicle M on the basis of information input from the camera 10, the radar device 12, and the finder 14 via the physical object recognition device 16. The physical object recognized by the recognizer 130 includes, for example, a four-wheeled vehicle, a two-wheeled vehicle, a pedestrian, a median strip, a road sign, a road marking, a dividing line, a utility pole, a guardrail, a fallen object, or the like. The recognizer 130 recognizes a state such as a position, velocity, or acceleration of the physical object. For example, the position of the physical object is recognized as a position on absolute coordinates (i.e., a relative position with respect to the host vehicle M) with a representative point (a center of gravity, a driving shaft center, or the like) of the host vehicle M as the origin and is used for control. The position of the physical object may be represented by a representative point such as a center of gravity or a corner of the physical object or may be represented by a represented region. The "state" of a physical object may include acceleration or jerk of the physical object or an "action state" (for example, whether or not a lane change is being made or is intended).

For example, the recognizer 130 recognizes a host vehicle lane in which the host vehicle M is traveling and an adjacent lane adjacent to the host vehicle lane. For example, the recognizer 130 recognizes the host vehicle lane or the adjacent lane by comparing a pattern of a road dividing line (for example, an arrangement of solid lines and broken lines) obtained from the second map information 62 with a pattern of road dividing lines in the vicinity of the host vehicle M recognized from an image captured by the camera 10.

The recognizer 130 may recognize a host vehicle line or an adjacent lane by recognizing a traveling path boundary (a road boundary) including a road dividing line, a road shoulder, a curb stone, a median strip, a guardrail, or the like as well as a road dividing line. In this recognition, a position of the host vehicle M acquired from the navigation device 50 or a processing result of the INS may be added. The recognizer 130 recognizes a temporary stop line, an obstacle, a red signal, a toll gate, and other road events.

When the host vehicle lane is recognized, the recognizer 130 recognizes a relative position or orientation of the host vehicle M with respect to the host vehicle lane. For example, the recognizer 130 may recognize a gap of a reference point of the host vehicle M from the center of the lane and an angle formed with respect to a line connecting the center of the lane in the traveling direction of the host vehicle M as a relative position and an orientation of the host vehicle M with respect to the host vehicle lane. Instead thereof, the recognizer 130 may recognize a position of the reference point of the host vehicle M relative to one side end portion (a road dividing line or a road boundary) of the host vehicle lane as a relative position of the host vehicle M relative to the host vehicle lane.

The action plan generator 140 includes, for example, an event determiner 142, a target trajectory generator 144, and a predictor 146. The event determiner 142 determines an automated driving event in a route on which a recommended lane has been determined. The event is information defining a traveling mode of the host vehicle M.

The event includes, for example, a constant-speed traveling event for causing the host vehicle M to travel on the same lane at constant speed, a following traveling event for causing the host vehicle M to follow another vehicle (hereinafter referred to as a preceding vehicle) that is present within a prescribed distance (for example, within 100 [m]) in front of the host vehicle M and is closest to the host vehicle M, a lane change event for causing the host vehicle M to make a lane change from the host vehicle lane to an adjacent lane, an interchange event for causing the host vehicle M to travel on a lane in a target direction at an interchange of a road, a junction event for causing the host vehicle M to join a main lane at a junction, an overtaking event for ending automated driving and performing switching to manual driving, and the like. "Following" may be, for example, a traveling mode for causing a vehicular gap (a relative distance) between the host vehicle M and the preceding vehicle to be constantly kept or a traveling mode for causing the host vehicle M to travel in the center of the host vehicle lane in addition to causing the vehicular gap between the host vehicle M and the preceding vehicle to be constantly kept. For example, the event may include an overtaking event for causing the host vehicle M to make a lane change to an original lane again after causing the host vehicle M to temporarily make a lane change to an adjacent lane and overtaking a preceding vehicle on the adjacent lane or for causing the host vehicle M to return an original position (for example, the center of the lane) after making the host vehicle M close to the dividing line defining the host vehicle lane and overtaking the preceding vehicle within the same lane without causing the host vehicle M to make a lane change to the adjacent lane, an avoidance event for causing the host vehicle M to perform at least one of braking and steering in order to avoid an obstacle in front of the host vehicle M, and the like.

For example, the event determiner 142 may change an event already determined for a current section to another event or determine a new event for the current section in accordance with a situation in the vicinity of the host vehicle M recognized by the recognizer 130 when the host vehicle M is traveling.

The target trajectory generator 144 generates a future target trajectory for causing the host vehicle M to automatically travel in a traveling mode defined according to an event (independently of a driver's operation) because the host vehicle M generally travels on the recommended lane determined by the recommended lane determiner 61 and further copes with a situation in the vicinity of the host vehicle when the host vehicle M travels on the recommended lane. The target trajectory includes, for example, a position element that determines a future position of the host vehicle M and a speed element that determines future speed of the host vehicle M and the like.

For example, the target trajectory generator 144 determines a plurality of points (trajectory points) where the host vehicle M is required to be sequentially reach as position elements of the target trajectory. The trajectory point is a point where the host vehicle M is required to reach for every prescribed travel distance (for example, about several [m]). The prescribed traveling distance may be calculated, for example, according to a road distance when the host vehicle M travels along a route.

The target trajectory generator 144 determines target speed and target acceleration for each prescribed sampling time (for example, about several tenth [sec]) as speed elements of the target trajectory. The trajectory point may be a position to which the host vehicle M is required to reach at the sampling time at every prescribed sampling time. In this case, the target speed or the target acceleration is determined by a sampling time and an interval between the trajectory points. The target trajectory generator 144 outputs information indicating the generated target trajectory to the second controller 160.

The predictor 146 predicts (determines) whether or not a crossing vehicle $m_{Ta}$ enters the host vehicle lane and has prescribed speed or less in the host vehicle lane on the basis of a state such a position or speed of an oncoming vehicle when the recognizer 130 recognizes that there is a crossing vehicle $m_{Ta}$ approaching a future arrival point in front of the host vehicle M in a traveling direction and that there is an oncoming vehicle traveling in an opposite direction to the traveling direction of the host vehicle M in an oncoming lane to the host vehicle lane. The prescribed speed is a speed at which it can be considered that the crossing vehicle $m_{Ta}$ stops or slows down, and is, for example, a speed of about 0 [km/h] or several [km/h].

The crossing vehicle $m_{Ta}$ is another vehicle whose traveling direction crosses the traveling direction of the host vehicle M. For example, the crossing vehicle $m_{Ta}$ includes a vehicle parked in a parking lot facing a road including the host vehicle lane, a vehicle that enters from another lane crossing a road including the host vehicle lane, or a vehicle that enters another lane from a break of a median strip extended and provided along the road. A direction crossing the traveling direction of the host vehicle M is, for example, a direction in which an angle formed by the traveling direction of the host vehicle M falls within an angular range of about plus or minus 70[°] on the basis of 90[°].

On the basis of a prediction result of the predictor 146, the above-described event determiner 142 changes the event determined for a current section in which the host vehicle M travels to another event. For example, when the predictor 146 predicts that the crossing vehicle $m_{Ta}$ has prescribed speed or less in the host vehicle lane, the event determiner 142 changes the current event to the avoidance event in which the crossing vehicle $m_{Ta}$ is an obstacle. In response to this, for example, the target trajectory generator 144 generates a target trajectory including target speed for decelerating the host vehicle M as a speed element to make a vehicular gap between the host vehicle M and the crossing vehicle $m_{Ta}$ constant. When the predictor 146 predicts that crossing vehicle $m_{Ta}$ will have a prescribed speed or less in the host vehicle lane, the event determiner 142 may change the current event to an overtaking event or change the current event to a lane change event.

When the predictor 146 does not predict that crossing vehicle $m_{Ta}$ has the prescribed speed or less in the host vehicle lane, the event determiner 142 may maintain the current event without changing the current event.

The second controller 160 controls the traveling driving force output device 200, the brake device 210, and the steering device 220 so that the host vehicle M passes through the target trajectory generated by the target trajectory generator 144 at a scheduled time.

The second controller 160 includes, for example, an acquirer 162, a speed controller 164, and a steering controller 166. The combination of the event determiner 142, the target trajectory generator 144, and the second controller 160 is an example of the "driving controller".

The acquirer 162 acquires information of a target trajectory (a trajectory point) generated by the target trajectory generator 144 and causes the acquired information to be stored in the memory of the storage 180.

The speed controller 164 controls one or both of the traveling driving force output device 200 and the brake device 210 on the basis of speed elements (for example, target speed, target acceleration, and the like) included in the target trajectory stored in the memory.

The steering controller 166 controls the steering device 220 in accordance with position elements (for example, a curvature representing a degree of curve of a target trajectory) included in the target trajectory stored in the memory. Hereinafter, control of one or both of a set of the traveling driving force output device 200 and the brake device 210 and the steering device 220 will be described as "automated driving".

For example, processes of the speed controller 164 and the steering controller 166 are implemented by a combination of feed-forward control and feedback control. As one example, the steering controller 166 combines and executes feed-forward control according to the curvature of the road in front of the host vehicle M and feedback control based on a gap from the target trajectory.

The traveling driving force output device 200 outputs a traveling driving force (a torque) for the vehicle to travel to driving wheels. For example, the traveling driving force output device 200 includes a combination of an internal combustion engine, an electric motor, a transmission, and the like, and an electric controller (ECU) configured to control them. The power ECU controls the above-described configuration in accordance with information input from the second controller 160 or information input from the driving operating element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with information input from the second controller 160 or information input from the driving operating element 80 so that a brake torque corresponding to a braking operation is output to each wheel. The brake device 210 may include a mechanism for transferring the hydraulic pressure generated by the operation of the brake pedal included in the driving operating element 80 to the cylinder via the master cylinder as a backup. The brake device 210 is not limited to the above-described configuration and may be an electronically controlled hydraulic brake device that controls an actuator in accordance with information input from the second controller 160 and transfers the hydraulic pressure of the master cylinder to the cylinder.

For example, the steering device 220 includes a steering ECU and an electric motor. The electric motor, for example, changes a direction of the steering wheels by applying a force to a rack and pinion mechanism. The steering ECU drives the electric motor and causes the direction of the steering wheels to be changed in accordance with the information input from the second controller 160 or the information input from the driving operating element 80.

[Processing Flow]

Figure 3:
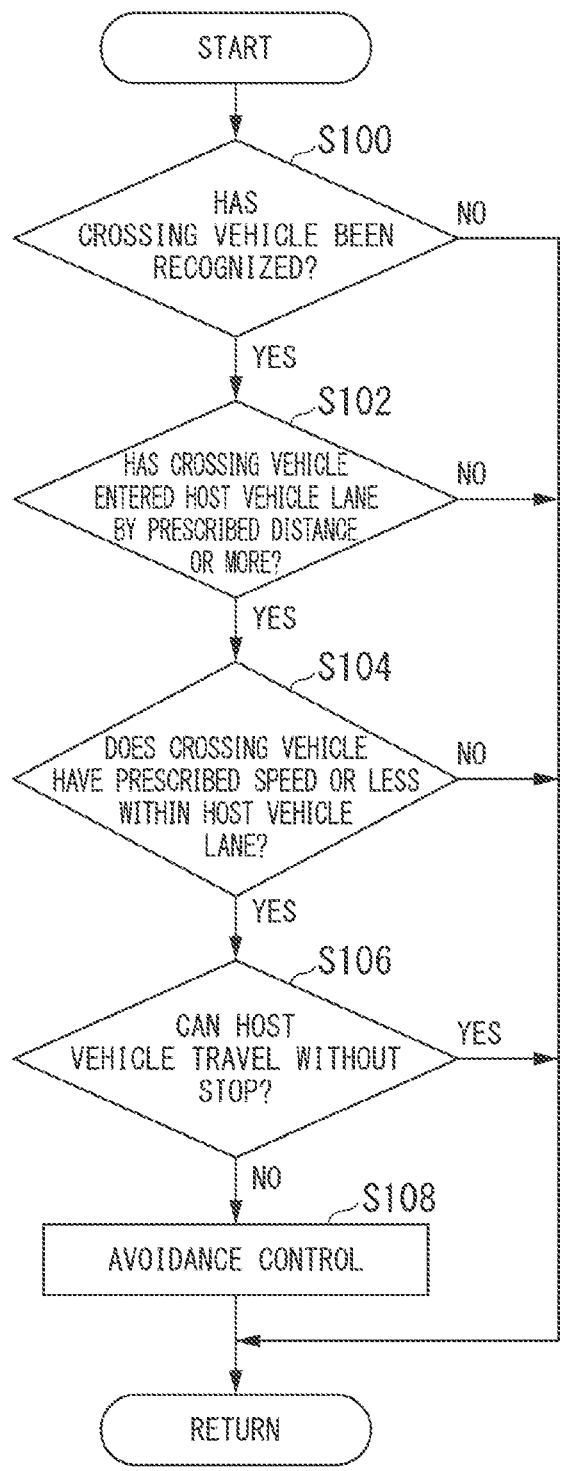
FIG. 3 is a flowchart showing an example of a flow of a series of processes of an automated driving control device of the first embodiment.

Hereinafter, a flow of a series of processes by the automated driving control device 100 of the first embodiment will be described using a flowchart. FIG. 3 is a flowchart showing an example of the flow of the series of processes by the automated driving control device 100 of the first embodiment. The process of the present flowchart may be iteratively executed at a prescribed cycle.

First, the predictor 146 determines whether or not the recognizer 130 has recognized the crossing vehicle $m_{Ta}$ approaching a future arrival point in front of the host vehicle M in a traveling direction (step S100). The future arrival point is, for example, a break of a median strip D to be described below (a point at which the median strip D is broken).

When the recognizer 130 has recognized the crossing vehicle $m_{Ta}$ approaching the future arrival point of the host vehicle M, the predictor 146 further determines whether or not the crossing vehicle $m_{Ta}$ entering a prescribed distance (for example, about several tens [cm]) or more inside the host vehicle lane has been recognized (step S102).

When the recognizer 130 has recognized that the crossing vehicle $m_{Ta}$ has entered the host vehicle lane by a prescribed distance or more, the predictor 146 predicts whether or not the crossing vehicle $m_{Ta}$ will enter the host vehicle lane and will have the prescribed speed or less on the basis of a state such as a position or a speed of an oncoming vehicle approaching a future arrival of the host vehicle M among the one or more oncoming vehicles present on an oncoming lane (step S104).

Figure 4:
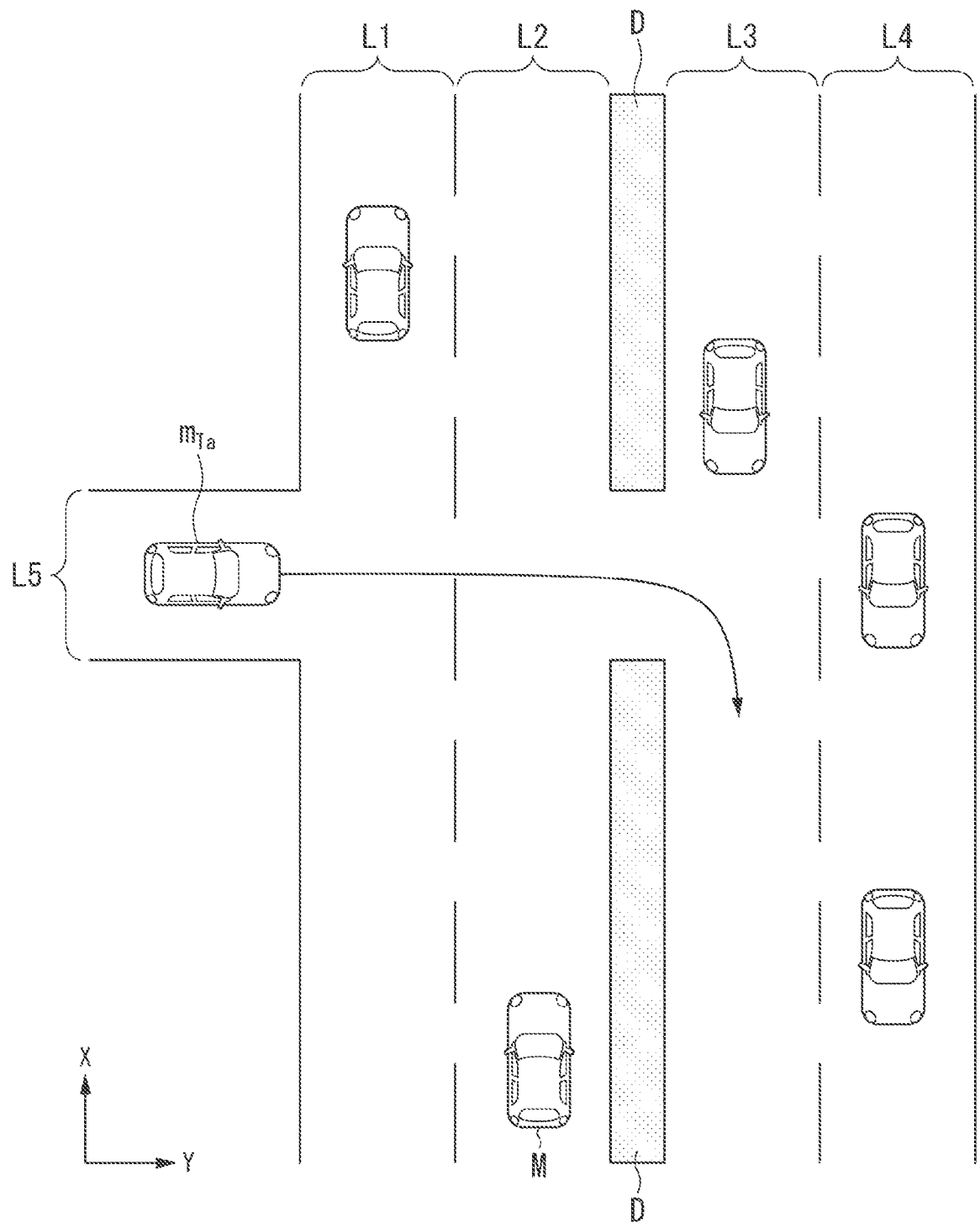
FIG. 4 is a diagram showing an example of a scene in which a crossing vehicle is recognized.
Figure 5:
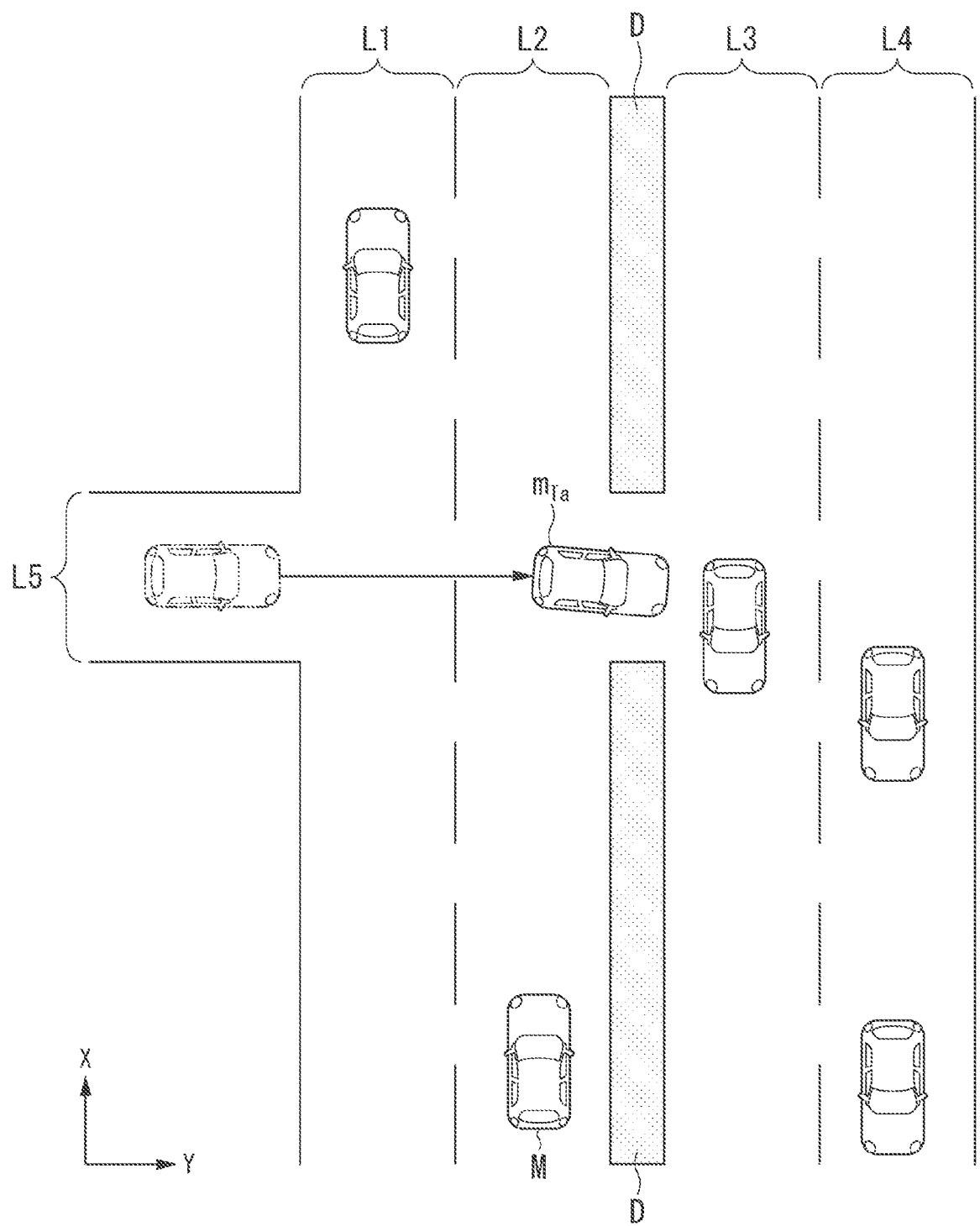
FIG. 5 is a diagram showing an example of a scene in which a crossing vehicle is recognized.

FIGS. 4 and 5 are diagrams showing an example of a scene in which the crossing vehicle $m_{Ta}$ is recognized. In FIGS. 4 and 5, X represents a traveling direction of the host vehicle M and Y represents a vehicle width direction orthogonal to a X direction. L1 and L2 represent traveling lanes of vehicles traveling in the same direction (the X direction in FIGS. 4 and 5) and L3 and L4 represent traveling lanes (oncoming lanes) of vehicles traveling in a direction opposite to the traveling direction of the vehicles traveling on the lanes L1 and L2. L5 represents an intersection crossing a road including the lanes L1 to L4. For example, when the right-hand traffic regulation is applied, the lane L2 becomes an overtaking lane for the lane L1 and the lane L3 becomes an overtaking lane for the lane L4. The lanes L1 and L2 and the lanes L3 and L4 are separated by a median strip D.

For example, when the host vehicle M travels on the lane L2, i.e., when the host vehicle lane is L2, the vehicle present at the intersection L5 is recognized as the crossing vehicle $m_{Ta}$. In the shown example, because a break of the median strip D (a point at which the median strip D is broken) exists in front of the crossing vehicle $m_{Ta}$ in the traveling direction, there is a possibility that the crossing vehicle $m_{Ta}$ crosses the lanes L1 and L2 and moves from the break of the median strip D to the oncoming lane L3 or L4. However, when there is an oncoming vehicle on an oncoming lane to which the crossing vehicle $m_{Ta}$ is trying to move, the crossing vehicle $m_{Ta}$ may not change the lane to the oncoming lane according to the movement of the oncoming vehicle. In this case, as shown in FIG. 5, there is a possibility that the crossing vehicle $m_{Ta}$ will stop on the lane L2. Accordingly, when the crossing vehicle $m_{Ta}$ approaching the break of the median strip D (an example of the future arrival point) is recognized, the predictor 146 predicts that the crossing vehicle $m_{Ta}$ will enter the inside from the outside of the host vehicle lane L2 and will have a prescribed speed or less in the host vehicle lane L2 on the basis of a state of an oncoming vehicle approaching the break of the median strip D. For example, the oncoming vehicle approaching the break of the median strip D is an oncoming vehicle that does not arrive at the break of the median strip D except for the oncoming vehicle passing through the break of the median strip D (the oncoming vehicle away from the break of the median strip D) aside among a plurality of oncoming vehicles traveling in the oncoming lane.

For example, at a point in time when the crossing vehicle $m_{Ta}$ crosses the lane L1 and the lane L2 from the intersection L5 and reaches the break of the median strip D, the predictor 146 predicts that the crossing vehicle $m_{Ta}$ will temporarily decelerate to a prescribed speed or less and stop or slow down in the host vehicle lane L2 when there are at least one or more oncoming vehicles at a prescribed distance from the break of the median strip D in a rear direction on the oncoming lane L3 (a rear direction when viewed from the oncoming vehicle) and predicts that the crossing vehicle $m_{Ta}$ will not decelerate to a prescribed speed or less in the host vehicle lane L2 when there is no oncoming vehicle at a prescribed distance from the break of the median strip D in a rear direction on the oncoming lane L3, i.e., when there is no oncoming vehicle approaching the break of the median strip D.

At a point in time when the crossing vehicle $m_{Ta}$ has crossed the lane L1 and the lane L2 from the intersection L5 and has reached the break of the median strip D, the predictor 146 may predict that the crossing vehicle $m_{Ta}$ will temporarily decelerate to a prescribed speed or less and stop or slow down in the host vehicle lane L2 when a time-to-collision (TTC) of the crossing vehicle $m_{Ta}$ and the oncoming vehicle is less than a first threshold value and may predict that the crossing vehicle $m_{Ta}$ will not decelerate to a prescribed speed or less in the host vehicle lane L2 when a TTC of the crossing vehicle $m_{Ta}$ and the oncoming vehicle is greater than or equal to the first threshold value. The TTC is, for example, a time obtained by dividing a relative distance (a relative distance in the vehicle traveling direction) between the crossing vehicle $m_{Ta}$ and the oncoming vehicle by a relative speed between the crossing vehicle $m_{Ta}$ and the oncoming vehicle.

In FIG. 3, when the predictor 146 predicts that the crossing vehicle $m_{Ta}$ will enter the inside from the outside of the host vehicle lane and will have the prescribed speed or less, the predictor 146 further predicts whether or not the host vehicle M will be able to travel while maintaining being in a current lane in a state in which the host vehicle M does not stop or slow down (step S106).

For example, while the host vehicle M is traveling, the predictor 146 predicts that the host vehicle M will be able to travel while maintaining being in a current lane without stopping or slowing down when the TTC between the crossing vehicle $m_{Ta}$ and the oncoming vehicle is greater than or equal to the first threshold value until the TTC between the crossing vehicle $m_{Ta}$ and the host vehicle M is less than the second threshold value and predicts that the host vehicle M cannot travel while maintaining being in a current lane in a state in which the host vehicle M does not stop or slow down, i.e., it is necessary for the host vehicle M to stop or slow down, when the TTC between the crossing vehicle $m_{Ta}$ and the oncoming vehicle is not greater than or equal to the first threshold value until the TTC between the crossing vehicle $m_{Ta}$ and the oncoming vehicle is less than the second threshold value.

When it is predicted that the crossing vehicle $m_{Ta}$ will have a prescribed speed or less in the host vehicle lane and furthermore predicted that the host vehicle M will be required to stop or slow down, the automated driving control device 100 performs avoidance control for avoiding the crossing vehicle $m_{Ta}$ (step S108).

For example, when the predictor 146 predicts that the crossing vehicle $m_{Ta}$ will have a prescribed speed or less in the host vehicle lane and further predicts that the host vehicle M is required to stop or slow down, the event determiner 142 changes the current event to the avoidance event in which the crossing vehicle $m_{Ta}$ is an obstacle to be avoided. In response thereto, for example, the target trajectory generator 144 generates a target trajectory in which target speed or target acceleration is low as compared with a target trajectory before the event change as a target trajectory corresponding to the avoidance event. Thereby, the host vehicle M decelerates. Instead of changing the current event to the avoidance event, the event determiner 142 may change to the lane change event. In this case, the target trajectory generator 144 may generate the target trajectory for changing the lane of the host vehicle M from the overtaking lane L2 to the first traveling lane L1 side as the target trajectory corresponding to the lane change event. Thereby, the host vehicle M makes the lane change from the overtaking lane L2 where the crossing vehicle $m_{Ta}$ stops to the first traveling lane L1. As described above, when there is a crossing vehicle $m_{Ta}$ that is likely to enter the host vehicle lane, it is possible to cause the host vehicle M to automatically travel so that the host vehicle M does not approach the crossing vehicle $m_{Ta}$ after pre-reading the future behavior of the crossing vehicle $m_{Ta}$ in order to predict whether or not the crossing vehicle $m_{Ta}$ has prescribed speed or less at which crossing vehicle $m_{Ta}$ stops or slows down in the host vehicle lane on the basis of a situation of a road in the vicinity of the host vehicle M.

According to the first embodiment described above, because the recognizer 130 configured to recognize a physical object in the vicinity of the host vehicle M, the predictor 146 configured to predict that the crossing vehicle $m_{Ta}$ has prescribed speed or less in a host vehicle lane on the basis of a state of the oncoming vehicle approaching a future arrival point when the recognizer 130 recognizes that the crossing vehicle $m_{Ta}$ whose traveling direction is a direction crossing a traveling direction of the host vehicle M and the oncoming vehicle approach the further arrival point of the host vehicle M, the target trajectory generator 144 configured to generate a target trajectory for causing the host vehicle M to avoid the crossing vehicle $m_{Ta}$ when the predictor 146 predicts that the crossing vehicle $m_{Ta}$ has prescribed speed or less in the host vehicle lane, and the second controller 160 configured to perform avoidance control on the basis of a target trajectory generated by the target trajectory generator 144 are provided, it is possible to cope with a change in a situation in the vicinity of the host vehicle M so that the crossing vehicle $m_{Ta}$ enters the host vehicle lane.

Second Embodiment

Hereinafter, a second embodiment will be described. The second embodiment is different from the above-described first embodiment in that it is predicted that the crossing vehicle $m_{Ta}$ has prescribed speed or less in the host vehicle lane when it is recognized that the preceding vehicle present in front of the host vehicle M changes the lane from the traveling lane of the host vehicle M (the host vehicle lane) to the adjacent lane. Hereinafter, differences from the first embodiment will be mainly described and description of functions and the like in common with the first embodiment will be omitted.

For example, a predictor 146 in the second embodiment predicts whether or not the crossing vehicle $m_{Ta}$ has prescribed speed or less in the host vehicle lane in accordance with presence or absence of the lane change of the preceding vehicle when the recognizer 130 recognizes that the crossing vehicle $m_{Ta}$ has entered the host vehicle lane by a predetermined distance or more.

Figure 6:
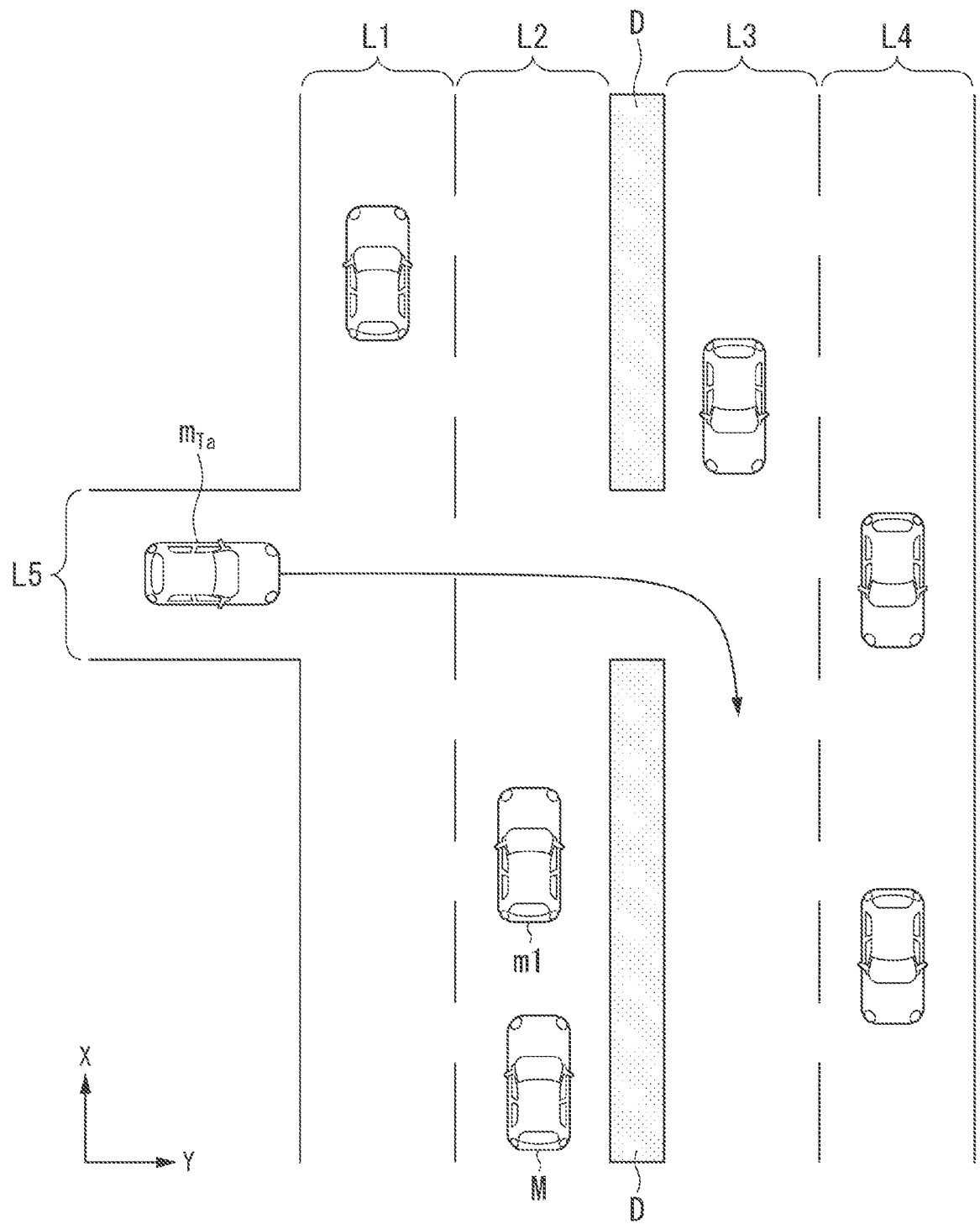
FIG. 6 is a diagram showing an example of a scene in which there is a preceding vehicle.
Figure 7:
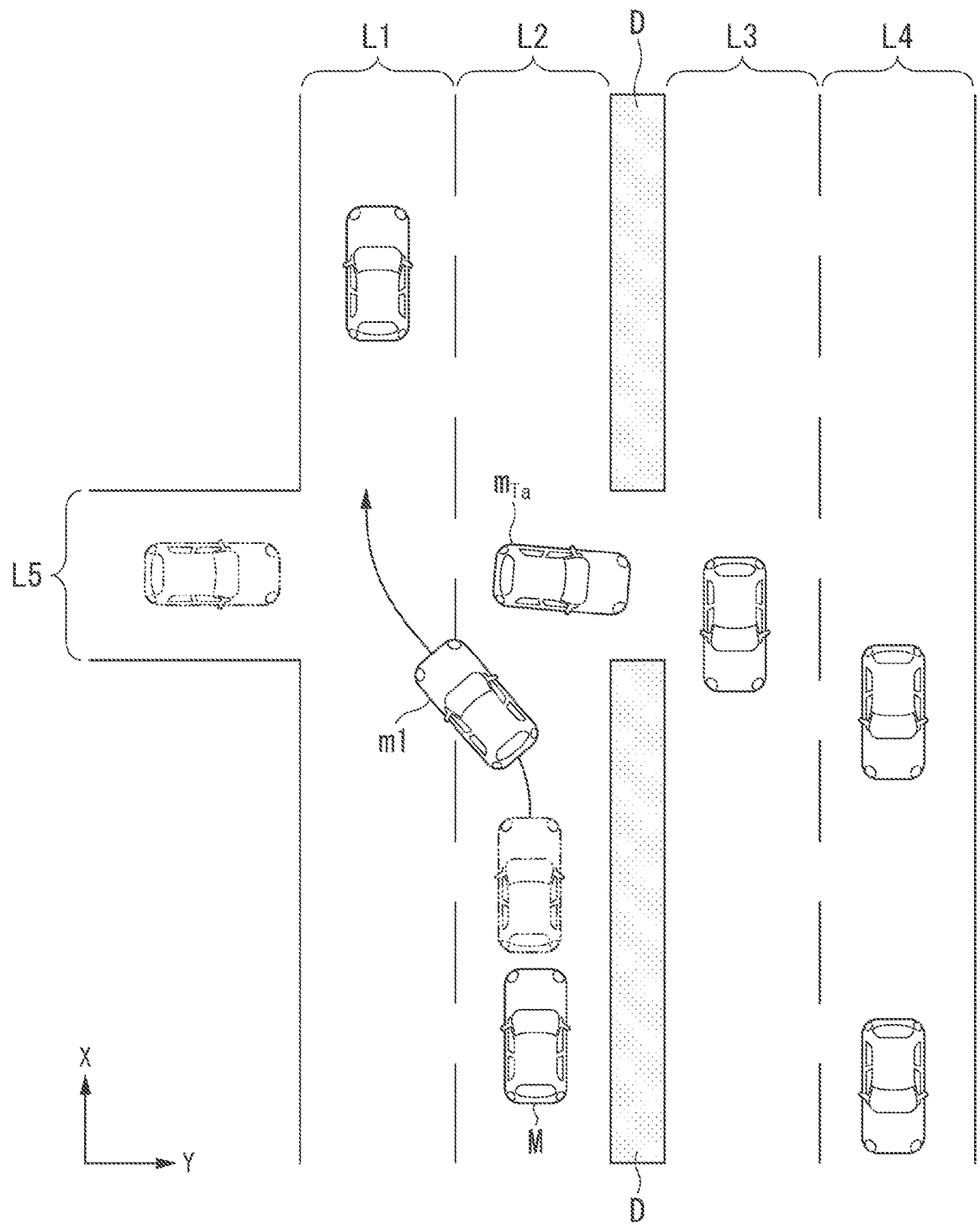
FIG. 7 is a diagram showing an example of a scene in which there is a preceding vehicle.

FIGS. 6 and 7 are diagrams showing an example of a scene where there is a preceding vehicle. In FIGS. 6 and 7, m1 represents a preceding vehicle present within a predetermined distance in front of the host vehicle M. For example, it is assumed that transition from the scene shown in FIG. 6 to the scene shown in FIG. 7 is made. In the scene shown in FIG. 7, the preceding vehicle m1 starts to make a lane change from an overtaking lane L2 to a first traveling lane L1. In this case, because the preceding vehicle m1 is regarded to have changed the lane to avoid the crossing vehicle $m_{Ta}$ that stops or slows down on the overtaking lane L2, the predictor 146 predicts that the crossing vehicle $m_{Ta}$ will have prescribed speed or less or already has prescribed speed or less on the overtaking lane L1 that is the host vehicle lane. Thereby, the automated driving control device 100 performs avoidance control for avoiding the crossing vehicle $m_{Ta}$.

According to the above-described second embodiment, because it is predicted that the crossing vehicle $m_{Ta}$ has prescribed speed or less in the host vehicle lane when it is recognized that the preceding vehicle present in front of the host vehicle M makes a lane change from the overtaking lane in which the host vehicle M travels to the adjacent lane, it is possible to cause the host vehicle M to be automatically driven so that the host vehicle M does not approach the crossing vehicle $m_{Ta}$ after future behavior of the crossing vehicle $m_{Ta}$ is accurately pre-read.

Third Embodiment

Hereinafter, a third embodiment will be described. The third embodiment is different from the above-described first and second embodiments in that a degree of avoidance of avoidance control for avoiding a crossing vehicle $m_{Ta}$ is changed on the basis of a size of a total length of the crossing vehicle $m_{Ta}$ when it is predicted that the crossing vehicle $m_{Ta}$ has prescribed speed or less in the host vehicle lane. The degree of avoidance of avoidance control is, for example, a degree to which the host vehicle M is decelerated at the time of avoidance or a degree to which the host vehicle M is to be moved to the adjacent lane side. Hereinafter, differences from the first and second embodiments will be mainly described and description of functions and the like in common with the first and second embodiments will be omitted.

Figure 8:
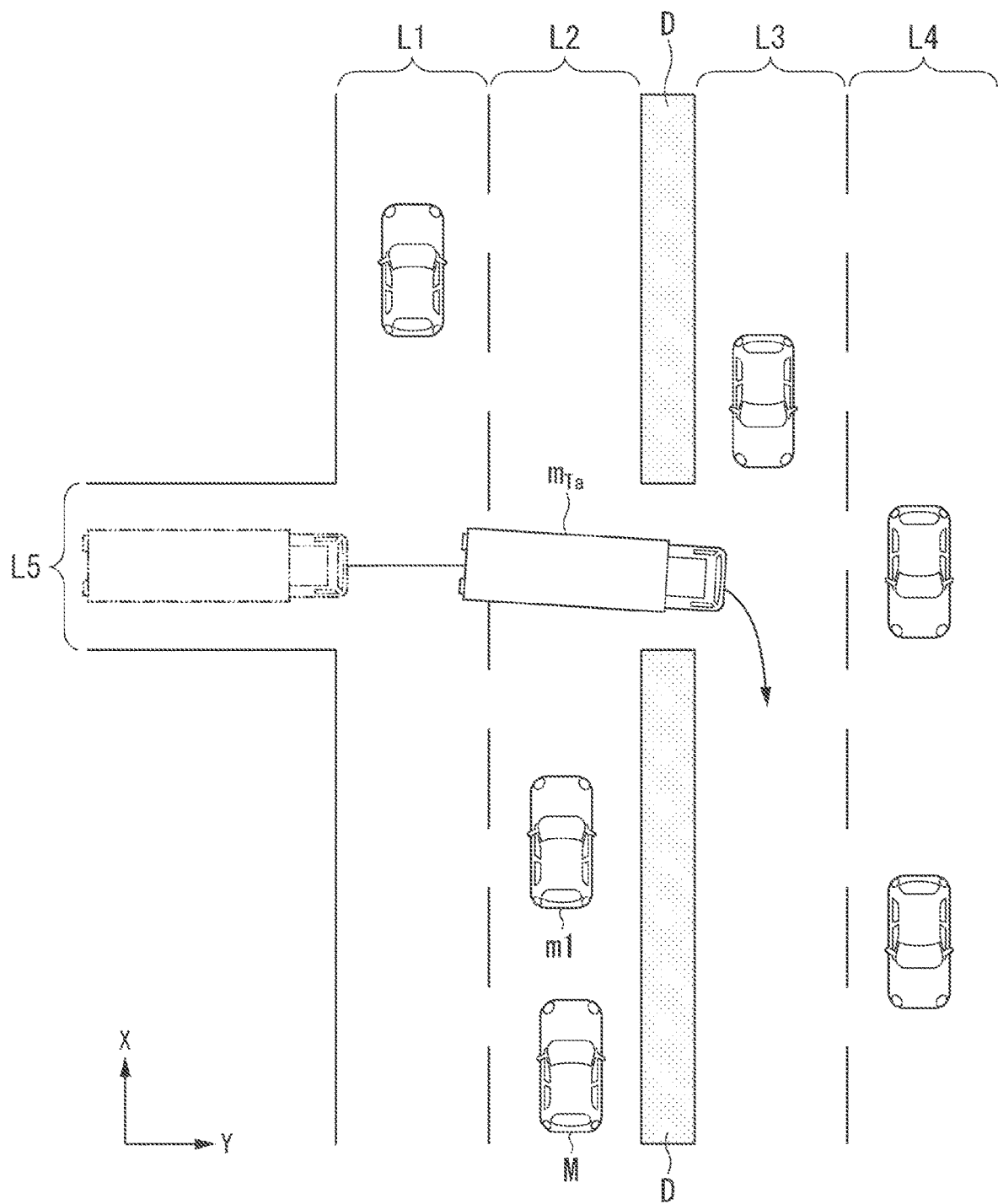
FIG. 8 is a diagram showing another example of a scene in which a crossing vehicle is recognized.

FIG. 8 is a diagram showing another example of a scene where the crossing vehicle $m_{Ta}$ is recognized. For example, as shown, when the crossing vehicle $m_{Ta}$ is a large-sized vehicle having a large total length such as a trailer, a time in which a stop time within the overtaking lane L1 tends to be long. In this case, the host vehicle M is required to more decelerate or more move to the first traveling lane L1 side than when the crossing vehicle $m_{Ta}$ is not a large-sized vehicle.

Accordingly, when the predictor 146 predicts that the crossing vehicle $m_{Ta}$ has prescribed speed or less in the host vehicle lane, the target trajectory generator 144 in the third embodiment increases the degree of avoidance of avoidance control as the total length of the crossing vehicle $m_{Ta}$ increases and decreases the degree of avoidance of avoidance control as the total length of the crossing vehicle $m_{Ta}$ decreases. More specifically, the target trajectory generator 144 generates a target trajectory for more decelerating the host vehicle M or causing the host vehicle M to more move to the first traveling lane L1 side as the total length of the crossing vehicle $m_{Ta}$ increases and generates a target trajectory for less decelerating the host vehicle M or causing the host vehicle M to less move to the first traveling lane L1 side as the total length of the crossing vehicle $m_{Ta}$ decreases.

Figure 9:
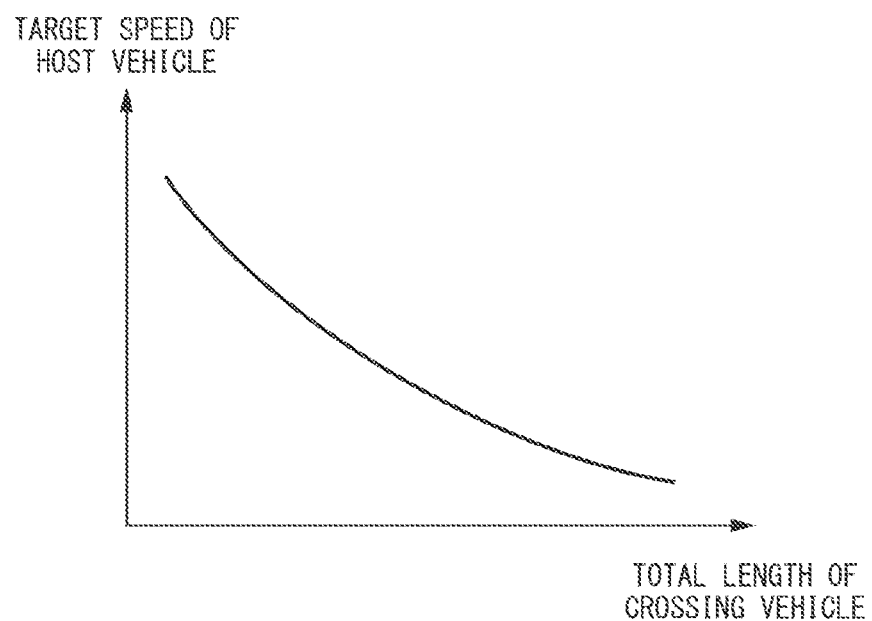
FIG. 9 is a diagram showing a relationship between target speed of a host vehicle and a total length of a crossing vehicle.

FIG. 9 is a diagram showing the relationship between the target speed of the host vehicle M and the total length of the crossing vehicle $m_{Ta}$. As shown, the target trajectory generator 144 decreases the target speed included as a speed element in the target trajectory as the total length of the crossing vehicle $m_{Ta}$ increases. Thereby, the automated driving control device 100 can appropriately perform the avoidance control according to a size of the crossing vehicle $m_{Ta}$.

According to the above-described third embodiment, because a degree of avoidance of avoidance control for avoiding the crossing vehicle $m_{Ta}$ is changed on the basis of the size of the total length of the crossing vehicle $m_{Ta}$ when it is predicted that the crossing vehicle $m_{Ta}$ has prescribed speed or less in the host vehicle lane, it is possible to appropriately perform avoidance control in accordance with the size of the crossing vehicle $m_{Ta}$.

[Hardware Configuration]

Figure 10:
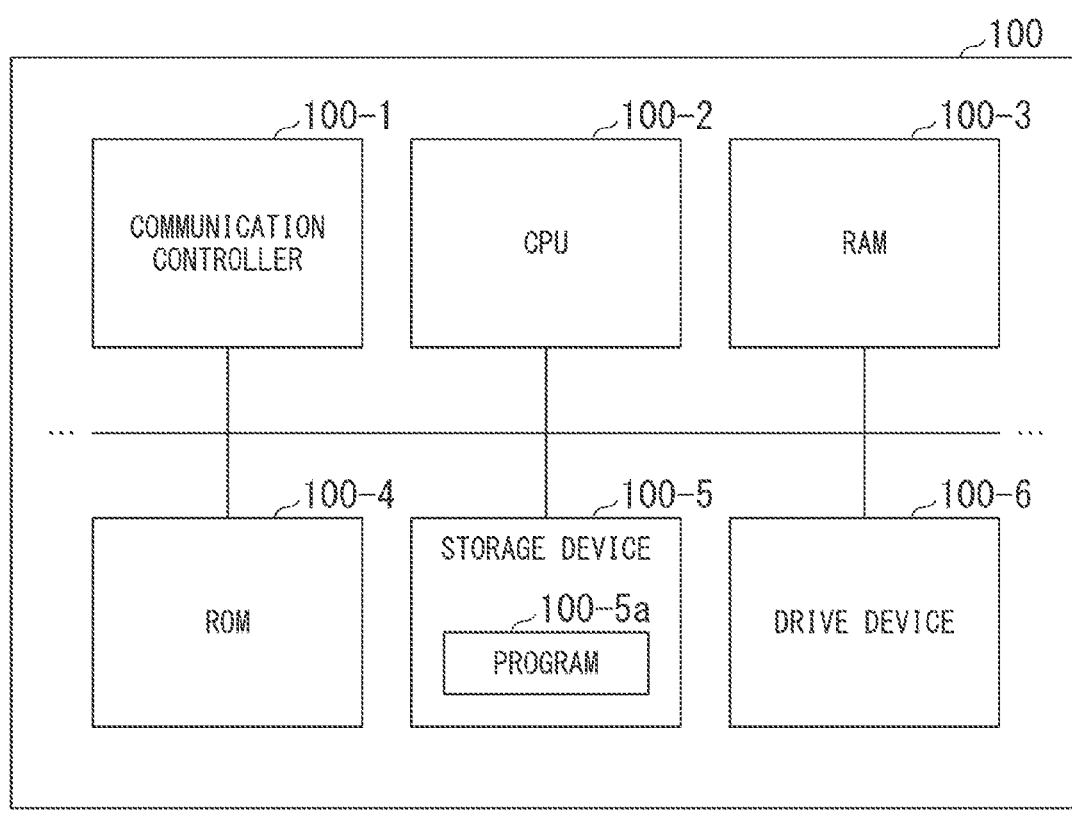
FIG. 10 is a diagram showing an example of a hardware configuration of the automated driving control device of the embodiment

FIG. 10 is a diagram showing an example of a hardware configuration of the automated driving control device 100. As shown, the automated driving control device 100 has a configuration in which a communication controller 100-1, a CPU 100-2, a RAM 100-3 used as a working memory, a ROM 100-4 storing a boot program and the like, a storage device 100-5 such as a flash memory or an HDD, a drive device 100-6, and the like are mutually connected by an internal bus or a dedicated communication line.

The communication controller 100-1 communicates with other components than the automated driving control device 100. A program 100-5a executed by the CPU 100-2 is stored in the storage device 100-5. This program is loaded to the RAM 100-3 by a direct memory access (DMA) controller (not shown) or the like and executed by the CPU 100-2. Thereby, one or both of the first controller 120 and the second controller 160 are implemented.

The above-described embodiment can be represented as follows.

A vehicle control device including:
a storage configured to store a program; and
a processor,
wherein the processor executes the program to:
recognize a physical object in the vicinity of a host vehicle;
predict that a crossing vehicle has prescribed speed or less in a host vehicle lane in which the host vehicle is present on the basis of a state of an oncoming vehicle when it is recognized that the crossing vehicle whose traveling direction is a direction crossing a traveling direction of the host vehicle and the oncoming vehicle with respect to the host vehicle approach a future arrival point of the host vehicle; and perform avoidance control for causing the host vehicle to avoid approaching the crossing vehicle by controlling at least one of speed and steering of the host vehicle when it is predicted that the crossing vehicle will have the prescribed speed or less in the host vehicle lane.

While preferred embodiments of the invention have been described and shown above, it should be understood that these are exemplary of the invention and are not to be considered as limiting. Additions, omissions, substitutions, and other modifications can be made without departing from the spirit or scope of the present invention.

Accordingly, the invention is not to be considered as being limited by the foregoing description, and is only limited by the scope of the appended claims.

What is claimed is:

1. A vehicle control device comprising:
a processor that executes instructions to:
recognize a physical object in the vicinity of a host vehicle;
predict that a crossing vehicle will have a prescribed speed or less in a host vehicle lane in which the host vehicle is present based on a state of an oncoming vehicle in response to recognizing that the crossing vehicle whose traveling direction is a direction crossing a traveling direction of the host vehicle and the oncoming vehicle with respect to the host vehicle approaches a future arrival point of the host vehicle; and
perform avoidance control for causing the host vehicle to avoid colliding with the crossing vehicle by controlling at least one of speed and steering of the host vehicle in response to predicting that the crossing vehicle will have the prescribed speed or less in the host vehicle lane.

2. The vehicle control device according to claim 1, wherein the processor further executes instructions to: predict that the crossing vehicle will have the prescribed speed or less in the host vehicle lane in response to recognizing that the host vehicle lane is an overtaking lane and a preceding vehicle present in front of the host vehicle moves from the host vehicle lane to an adjacent lane adjacent to the host vehicle lane.

3. The vehicle control device according to claim 1, wherein the processor further executes instructions to: predict that the crossing vehicle will have the prescribed speed or less in the host vehicle lane based on a state of the oncoming vehicle in response to recognizing that the crossing vehicle has entered the host vehicle lane by a prescribed distance or more.

4. The vehicle control device according to claim 1, wherein the processor further executes instructions to: change a degree of avoidance of the avoidance control in accordance with a size of the total length in response to predicting that the crossing vehicle will have the prescribed speed or less in the host vehicle lane.

5. The vehicle control device according to claim 4, wherein the processor further executes instructions to: increase the degree of avoidance of the avoidance control as the total length of the crossing vehicle increases and decreases the degree of avoidance of the avoidance control as the total length of the crossing vehicle decreases.

6. A vehicle control method comprising:
recognizing, by an in-vehicle computer, a physical object in the vicinity of a host vehicle;
predicting, by the in-vehicle computer, that a crossing vehicle has a prescribed speed or less in a host vehicle lane in which the host vehicle is present based on a state of an oncoming vehicle when it is recognized that the crossing vehicle whose traveling direction is a direction crossing a traveling direction of the host vehicle and the oncoming vehicle with respect to the host vehicle approaches a future arrival point of the host vehicle; and
performing, by the in-vehicle computer, avoidance control for causing the host vehicle to avoid colliding with the crossing vehicle by controlling at least one of speed and steering of the host vehicle when it is predicted that the crossing vehicle will have the prescribed speed or less in the host vehicle lane.

7. A computer-readable non-transitory storage medium storing a program for causing an in-vehicle computer to execute:
a process of recognizing a physical object in the vicinity of a host vehicle;
a process of predicting that a crossing vehicle will have a prescribed speed or less in a host vehicle lane in which the host vehicle is present based on a state of an oncoming vehicle when it is recognized that the crossing vehicle whose traveling direction is a direction crossing a traveling direction of the host vehicle and the oncoming vehicle with respect to the host vehicle approaches a future arrival point of the host vehicle; and
a process of performing avoidance control for causing the host vehicle to avoid colliding with the crossing vehicle by controlling at least one of speed and steering of the host vehicle when it is predicted that the crossing vehicle will have the prescribed speed or less in the host vehicle lane.

* * * * *